(12) United States Patent
Takemoto

(10) Patent No.: US 10,976,606 B2
(45) Date of Patent: Apr. 13, 2021

(54) DISPLAY DEVICE

(71) Applicant: Funai Electric Co., LTD., Osaka (JP)

(72) Inventor: Seiji Takemoto, Osaka (JP)

(73) Assignee: Funai Electric Co., LTD., Osaka (JP)

( * ) Notice: Subject to any disclaimer, the term of this patent is extended or adjusted under 35 U.S.C. 154(b) by 0 days.

(21) Appl. No.: 16/534,221

(22) Filed: Aug. 7, 2019

(65) Prior Publication Data

US 2020/0050059 A1    Feb. 13, 2020

(30) Foreign Application Priority Data

Aug. 8, 2018 (JP) .............................. JP2018-149144

(51) Int. Cl.
  *G02F 1/1335*  (2006.01)
  *G02F 1/13357* (2006.01)
  *F21V 8/00*    (2006.01)
  *G02F 1/1333*  (2006.01)

(52) U.S. Cl.
  CPC ..... *G02F 1/133608* (2013.01); *G02B 6/0021* (2013.01); *G02B 6/0031* (2013.01); *G02B 6/0033* (2013.01); *G02B 6/0068* (2013.01); *G02F 1/133605* (2013.01); *G02F 1/133606* (2013.01); *G02F 2001/133314* (2013.01)

(58) Field of Classification Search
  CPC ......... G02F 1/133603; G02F 1/133606; G02F 1/133615; G02F 1/133605; G02F 1/133504; G02F 1/133526; G02F 1/133553; G02F 1/1336; G02F 1/133602; G02F 1/133611; G02F 1/133608; G02F 2001/133607; G02B 6/0073; G02B 6/0051; G02B 6/0068; G02B 6/0021; G02B 6/0031; G02B 6/0033
See application file for complete search history.

(56) References Cited

U.S. PATENT DOCUMENTS

| | | | | |
|---|---|---|---|---|
| 6,369,867 | B1* | 4/2002 | Ge | G02F 1/133305 |
| | | | | 349/122 |
| 6,992,718 | B1* | 1/2006 | Takahara | G02B 23/14 |
| | | | | 348/333.09 |
| 10,216,039 | B2* | 2/2019 | Kim | G02B 6/003 |
| 2008/0285268 | A1 | 11/2008 | Oku et al. | |

(Continued)

FOREIGN PATENT DOCUMENTS

| EP | 3187926 A1 | 7/2017 |
|---|---|---|
| JP | H07-94008 A | 4/1995 |

OTHER PUBLICATIONS

Extended European Search Report issued in European Application No. 19190454.9, dated Nov. 29, 2019 (9 pages).

*Primary Examiner* — Thoi V Duong
(74) *Attorney, Agent, or Firm* — Osha Bergman Watanabe & Burton LLP

(57) ABSTRACT

A display device includes: a display panel; a housing that comprises a front face in which the display panel is disposed; a light source unit that is disposed on an inner surface of the housing, and comprises a light source and an optical lens covering the light source; an attenuating plate that is disposed between the light source unit and the display panel, and attenuates an intensity of light irradiated from the light source unit, the light passing through the attenuating plate toward the display panel; and a reflection plate that reflects the light having passed through the attenuating plate toward the display panel.

13 Claims, 16 Drawing Sheets

(56) References Cited

U.S. PATENT DOCUMENTS

2011/0007506 A1* 1/2011 Kinoshita ......... G02F 1/133603
362/235
2012/0120343 A1* 5/2012 Yamamoto ............... G02B 3/04
349/61

* cited by examiner

DISPLAY DEVICE

CROSS-REFERENCE TO RELATED APPLICATION

This Application claims priority from Japanese Patent Application No. 2018-149144 filed on Aug. 8, 2018, the entire contents of which are hereby incorporated by reference.

BACKGROUND

Technical Field

The present invention relates to a display device, and more particularly relates to a display device provided with a light source unit disposed on an inner surface portion of a housing.

Description of the Related Art

A display device provided with a light source unit disposed on an inner surface portion of a housing is conventionally known (for example, see Japanese Unexamined Patent Application Publication No. H7-94008).

Japanese Unexamined Patent Application Publication No. H7-94008 discloses a surface lighting device used as a backlight of a liquid crystal display device. This surface lighting device is provided with a light source disposed on an inner surface portion. Moreover, an irregular reflection layer that reflects light from the light source to the front surface side (display panel side) is provided on the inner back surface of this surface lighting device. Moreover, a light diffusion plate is provided on the front surface of the surface lighting device, wherein light reflected from the irregular reflection layer and light from the light source are irradiated, and this irradiated light is diffused to the display panel side. Moreover, the surface lighting device is provided with a semitransparent plate provided between the light source and the light diffusion plate, wherein light irradiated from the light source toward an edge side of the light diffusion plate is shielded.

However, in the surface lighting device described in Japanese Unexamined Patent Application Publication No. H7-94008, while the luminance on the light diffusion plate (and display panel) is suppressed from increasing locally because the intensity of the light from the light source is attenuated by the semitransparent plate, there are cases wherein the luminance decreases excessively. In such cases, there are times when the luminance of the display panel decreases locally.

SUMMARY

In light of the above, one or more embodiments of the present invention provide a display device that can suppress luminance from decreasing locally while suppressing luminance from increasing locally on the display panel.

One or more embodiments of the present invention provide a display device comprising: a display panel; a housing that comprises a front face in which the display panel is disposed; a light source unit that is disposed on an inner surface of the housing, and comprises a light source and an optical lens covering the light source; an attenuating plate that is disposed between the light source unit and the display panel, and attenuates an intensity of light irradiated from the light source unit, the light passing through the attenuating plate toward the display panel; and a reflection plate that reflects the light having passed through the attenuating plate toward the display panel.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Embodiments of the present invention will be described below referring to drawings.

The configuration of a liquid crystal display device 100 according to one or more embodiments will be described referring to FIG. 1 to FIG. 6C. Note that in the present specification, the front surface side and back surface side of the liquid crystal display device 100 will be respectively described as the Y1 direction side and the Y2 direction side. Furthermore, when viewing the liquid crystal display device 100 from the front surface side, the left side and right side will be respectively described as the X1 direction side and the X2 direction side. Moreover, the upper side and lower side of the liquid crystal display device 100 will be respectively described as the Z1 direction side and the Z2 direction side. Note that the liquid crystal display device 100 is one example of the "display device" in the scope of patent claims.

(Configuration of the Liquid Crystal Display Device)

Figure 1:
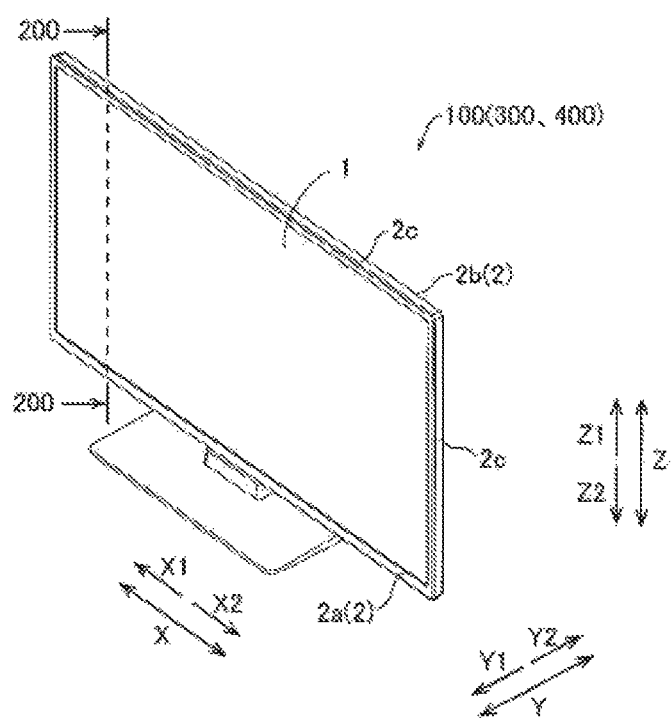
FIG. 1 is a perspective view illustrating the configuration of a liquid crystal display device according to one or more embodiments.

As illustrated in FIG. 1, the liquid crystal display device 100 is provided with a liquid crystal panel 1. The liquid crystal panel 1 has a substantially rectangular shape. Moreover, the liquid crystal display device 100 is provided with a housing 2 in which the liquid crystal panel 1 is disposed on the front surface. The housing 2 includes a front cabinet 2a for accommodating the liquid crystal panel 1, and a rear cabinet 2b provided on the back surface side (Y2 direction side) of the front cabinet 2a. Note that the liquid crystal panel 1 is one example of the "display panel" in the scope of patent claims.

Figure 2:
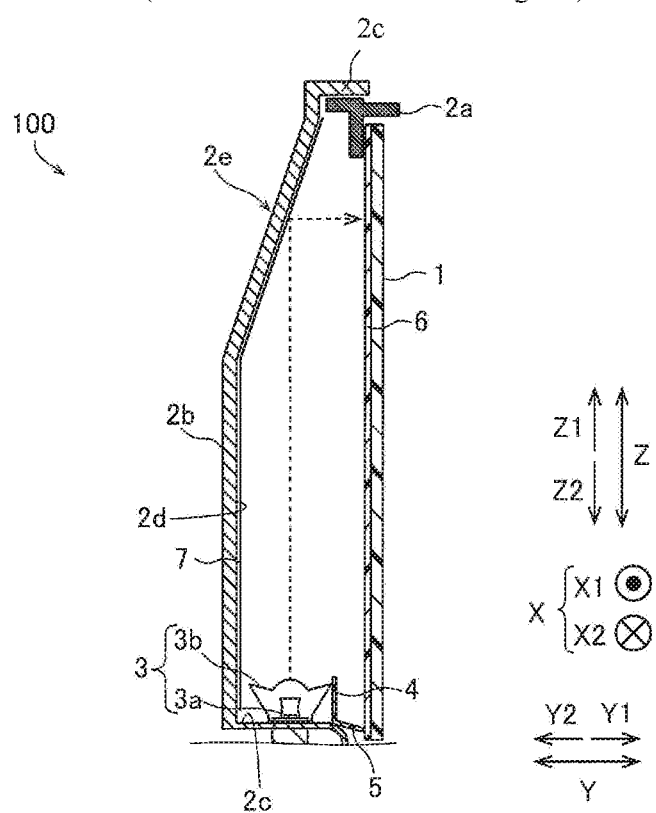
FIG. 2 is a cross-sectional diagram along the 200-200 line in FIG. 1.

As illustrated in FIG. 2, the liquid crystal display device 100 is provided with a light source unit 3 disposed on an inner surface portion 2c of the housing 2 (rear cabinet 2b). The inner surface portion 2c is provided along each of the four sides of the substantially rectangular-shaped liquid crystal panel 1. From among the two inner surface portions 2c extending in the X direction, the light source unit 3 is disposed on the inner surface portion 2c provided on the lower side (Z2 direction side).

The light source unit 3 includes a light emitting diode (LED) 3a and an optical lens 3b covering the LED 3a. The LED 3a is disposed in a plurality in parallel along the X direction from the vicinity of the edge on the X1 direction side to the vicinity of the edge on the X2 direction side on the liquid crystal display device 100. Furthermore, the optical lens 3b is provided extending in the X direction to cover all of the plurality of LED 3a. Note that the LED 3a is one example of the "light source" in the scope of patent claims.

Figure 3:
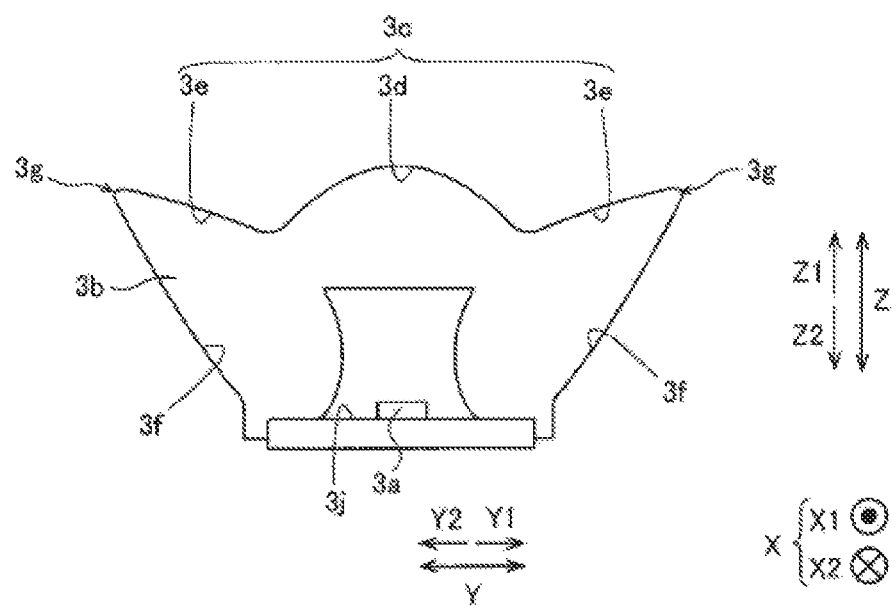
FIG. 3 is a diagram illustrating the configuration of a light source unit of the liquid crystal display device according to one or more embodiments.

Here, the configuration of the optical lens 3b will be described referring to FIG. 3. As illustrated in FIG. 3, the optical lens 3b includes a light-emitting surface 3c provided to cover the LED 3a from the Z1 direction side. The light-emitting surface 3c has a portion 3d formed curved on the upper side of the LED 3a (Z1 direction side) and a portion 3e provided to interpose the portion 3d in the X direction. The portion 3e is provided to slant to the upper side from the edge of the portion 3d (direction side away from a surface 3j described hereafter).

Furthermore, the optical lens 3b includes a side surface 3f continuously formed with the light-emitting surface 3c, being provided below the light-emitting surface 3c (side of the surface 3j described hereafter). The side surface 3f is provided to interpose the LED 3a in the X direction when viewed from the Z1 direction side. The side surface 3f is provided to slant upward as it separates from the LED 3a.

Furthermore, the portion 3e of the light-emitting surface 3c and the side surface 3f are continuously formed on the edge 3g of the optical lens 3b. Because each of the portion 3e of the light-emitting surface 3c and the side surface 3f are slanted, the optical lens 3b has a shape tapered toward the edge 3g.

Figure 4:
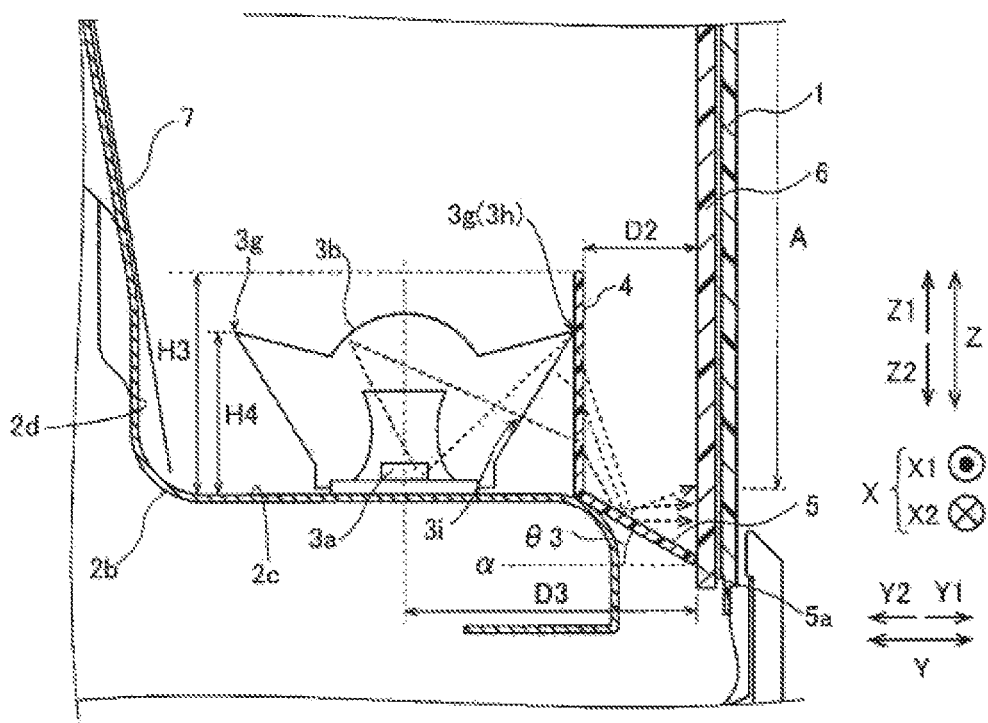
FIG. 4 is a partially expanded diagram of the light source unit periphery of the liquid crystal display device according to one or more embodiments.

As illustrated in FIG. 4, the liquid crystal display device 100 is provided with a diffusion plate 4 provided between the light source unit 3 and the liquid crystal panel 1. The diffusion plate 4 is configured to attenuate the intensity of light irradiated from the light source unit 3 and allow it to pass through to the liquid crystal panel 1 side. Specifically, the diffusion plate 4 diffuses light irradiated from the light source unit 3 and allows it to pass through to the liquid crystal panel 1 side. The transmittance, reflectivity, and diffusivity of light of the diffusion plate 4 are respectively 75%, 25%, and 90%. Note that the transmittance, reflectivity, and diffusivity of light of the diffusion plate 4 are not limited to these values. Furthermore, the diffusion plate 4 is one example of the "attenuating plate" in the scope of patent claims. Note that transmittance refers to the ratio of the intensity before a wave passes through a substance and the intensity after it has passed through. Moreover, reflectivity refers to the ratio of the energy of a reflected wave with respect to the energy of an incident wave when a wave is reflected on an interface of a medium. Moreover, diffusivity refers to the degree to which incident light is diffused.

Moreover, the diffusion plate 4 is substantially plate-shaped. Furthermore, the diffusion plate 4 is provided extending in the X direction along the optical lens 3b.

Moreover, the diffusion plate 4 is provided substantially parallel to the liquid crystal panel 1. Specifically, the diffusion plate 4 is provided extending from the inner surface portion 2c of the housing 2 to the upper side (Z1 direction side) when viewed from the X direction.

Figure 5:
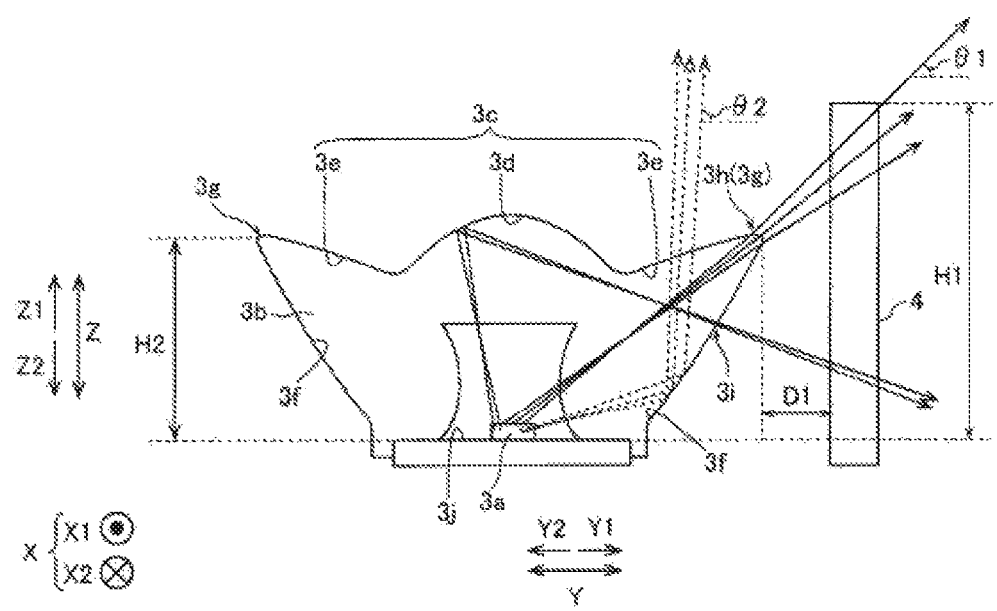
FIG. 5 is a diagram for describing the relationship between light from the light source unit and the diffusion plate of the liquid crystal display device according to one or more embodiments.

Here, as illustrated in FIG. 5, a first concentrating unit 3h and a second concentrating unit 3i (portions wherein beams of light concentrate more than other portions and light having relatively high luminance is emitted) are formed on the optical lens 3b for locally emitting light to the liquid crystal panel 1. That is, light emitted from the first concentrating unit 3h and the second concentrating unit 3i is light that is obtained by making the luminance of the liquid crystal panel 1 a high luminance.

The first concentrating unit 3h is formed on the edge 3g of the optical lens 3b. The second concentrating unit 3i is formed on the side surface 3f of the optical lens 3b. Light from the first concentrating unit 3h is mainly emitted to the upper side toward the liquid crystal panel 1 side (Z1 direction side). Furthermore, light from the second concentrating unit 3i is mainly emitted to the lower side toward the liquid crystal panel 1 side (Z2 direction side). Note that in FIG. 5, light locally irradiated to the liquid crystal panel 1 (light from the first concentrating unit 3h and the second concentrating unit 3i) is displayed as a full arrow, and light not locally irradiated to the liquid crystal panel 1 (light irradiated relatively uniformly) is displayed as a dotted line arrow. Furthermore, the state of light diffused by the diffusion plate 4 is omitted from the drawings in FIG. 5 for simplicity. Note that the first concentrating unit 3h and the second concentrating unit 3i are respectively one example of the "concentrating unit (concentration portion)" in the scope of patent claims.

In one or more embodiments, the diffusion plate 4 is provided to shield light emitted from the first concentrating unit 3h and the second concentrating unit 3i to the liquid crystal panel 1. That is, the diffusion plate 4 is provided on the optical path of the light emitted from the first concentrating unit 3h and the second concentrating unit 3i. Here, from among light from the first concentrating unit 3h, the largest angle of the slanted angle with respect to the perpendicular line α (see FIG. 4) of the liquid crystal panel 1 (see FIG. 2) (acute angle made up of the perpendicular line α and the light from the first concentrating unit 3h) is made to be an angle θ1 (for example, 60°), and from among light from places other than the first concentrating unit 3h and the second concentrating unit 3i (light shown by the dotted line arrow in FIG. 5), the smallest angle of the slanted angle with respect to the perpendicular line α (see FIG. 4) of the liquid crystal panel 1 (acute angle made up of the perpendicular line α and the light from places other than the first concentrating unit 3h and the second concentrating unit 3i) is made to be an angle θ2 (for example, 80°). Furthermore, the distance from the diffusion plate 4 to the edge 3g of the liquid crystal panel 1 side is made to be a distance D1. Moreover, the height of the diffusion plate 4 from the surface 3j to which the LED 3a is mounted is made to be a height H1. Moreover, the height of the edge 3g from the surface 3j to which the LED 3a is mounted is made to be a height H2. Note that the distance D1 is near zero in one or more embodiments as described hereafter, but the distance D1 is exemplified in the FIG. 5 as being larger than zero to describe such.

In one or more embodiments, the height H1 is larger than H2+D1×tan θ1. Therefore, light from the first concentrating unit 3h is shielded by the diffusion plate 4. Note that even if the height H1 is smaller than H2+D1×tan θ2, light from places other than the first concentrating unit 3h and the second concentrating unit 3i (light shown by the dotted line arrow) is not shielded by the diffusion plate 4.

Note that in one or more embodiments, a height H3 (see FIG. 4, for example, approximately 14 mm) of the diffusion plate 4 from the inner surface portion 2c is set so that the height H1 is larger than H2+D1×tan θ1. Furthermore, the height H3 of the diffusion plate 4 from the inner surface portion 2c is larger than a height H4 (see FIG. 4) of the edge 3g from the inner surface portion 2c. Note that the height H3 may be a size different from 14 mm. For example, a constant effect is achieved if the height H3 is 2 mm or more.

Moreover, in one or more embodiments, as illustrated in FIG. 4, the diffusion plate 4 is disposed further on the optical lens 3b side than the center between the edge 3g of the liquid crystal panel 1 side of the optical lens 3b and the liquid crystal panel 1 in a direction perpendicular to the liquid crystal panel 1 (Y direction).

Specifically, the diffusion plate 4 is disposed in the vicinity of the optical lens 3b. Specifically, the edge 3g on the liquid crystal panel 1 side of the optical lens 3b and the diffusion plate 4 contact. That is, the distance between an optical sheet 6 described hereafter and the edge 3g on the liquid crystal panel 1 side of the optical lens 3b, and the distance between the optical sheet 6 and the diffusion plate 4 respectively have substantially equal sizes (distance D2). For example, the distance D2 is approximately 8.7 mm. Note that, for example, the distance D3 (see FIG. 4) between the center of the LED 3a and the optical sheet 6 is 20 mm. Note that each of the light source unit 3 and the diffusion plate 4 may be disposed separated further from the optical sheet 6 so that the distances D2 and D3 are larger.

Furthermore, in one or more embodiments, the liquid crystal display device 100 is provided with a reflective plate 5 for reflecting light that has passed through the diffusion plate 4 to the liquid crystal panel 1 side. Specifically, the reflective plate 5 mainly reflects (see the dotted line arrow in FIG. 4) light emitted from the second concentrating unit 3i (see FIG. 5) that has been diffused by the diffusion plate 4 to the liquid crystal panel 1 side. Furthermore, the reflective plate 5 reflects (see the dotted line arrow in FIG. 4) at least a portion of light emitted from the first concentrating unit 3h (see FIG. 5) that has been diffused by the diffusion plate 4 to the liquid crystal panel 1 side. Moreover, from among the optical lens 3b, the reflective plate 5 reflects (see the dotted line arrow in FIG. 4) at least a portion of light emitted from places other than the first concentrating unit 3h and the second concentrating unit 3i that has been diffused by the diffusion plate 4 to the liquid crystal panel 1 side. Note that the reflective plate 5 is one example of the "reflective unit" in the scope of patent claims.

The reflective plate 5 is substantially plate-shaped. The reflective plate 5 is provided extending along the optical lens 3b and the diffusion plate 4. That is, the reflective plate 5 is provided extending along the X direction similar to the optical lens 3b and the diffusion plate 4.

Furthermore, the diffusion plate 4 and the reflective plate 5 are mutually formed of the same material. That is, the transmittance, reflectivity, and diffusivity of light of the reflective plate 5 are respectively 75%, 25%, and 90%. Note that the reflectivity of the reflective plate 5 is not limited to this. The reflectivity of the reflective plate 5 may be within a range of 10% to 100%.

Moreover, the diffusion plate 4 and the reflective plate 5 are integrally formed. Specifically, the diffusion plate 4 and the reflective plate 5 are formed by curving a single plate-shaped member.

The diffusion plate 4 and reflective plate 5 are fixed (held) because the reflective plate 5 is supported by the inner surface portion 2c.

Furthermore, almost the entirety of the reflective plate 5 is provided further to the outer peripheral side than a display region A of the liquid crystal panel 1. Specifically, almost the entirety of the reflective plate 5 is provided on the lower side of the display region A when viewed from the X direction. That is, although omitted from the drawings, almost the entirety of the reflective plate 5 overlaps with a region (a so-called frame region) from among the liquid crystal panel 1 further to the lower side than the display region A when viewing the liquid crystal panel 1 from the front (viewing from the Y1 direction side). Furthermore, almost the entirety of the diffusion plate 4 overlaps with the display region A when viewing the liquid crystal panel 1 from the front (viewing from the Y1 direction side).

Furthermore, the reflective plate 5 is slanted to the liquid crystal panel 1 side with respect to the perpendicular line α of the liquid crystal panel 1 (that is, the line portion extending in the Y direction. Specifically, the reflective plate 5 is slanted to the liquid crystal panel 1 side having an edge 5a, described hereafter, of the reflective plate 5 as its fulcrum. That is, the reflective plate 5 is slanted from the edge 5a to the upper side (Z1 direction side) toward the diffusion plate 4 (toward the Y2 direction side). Specifically, the angle θ3 (acute angle made by the perpendicular line α and the reflective plate 5) between the perpendicular line α of the liquid display panel 1 and the reflective plate 5 is, for example, 30°. Note that the angle θ3 is not limited to 30°. For example, the angle θ3 may be an angle within a range of −30° to 70°. Note that an angle of −30° refers to the reflective plate 5 being slanted 30° in a direction opposite the liquid crystal panel 1.

Moreover, the reflective plate 5 is provided so that the edge 5a on the liquid crystal panel 1 side (Y1 direction side) of the reflective plate 5 is positioned in the vicinity of the display region A of the liquid crystal panel 1. Specifically, the optical sheet 6 provided on the back surface of the liquid crystal panel 1 is provided in the liquid crystal display device 100. The reflective plate 5 is provided so that the edge 5a of the reflective plate 5 contacts the optical sheet 6.

Moreover, the liquid crystal display device 100 is provided with a reflective sheet 7 provided to oppose the liquid crystal panel 1. The reflective sheet 7 is provided to cover a bottom surface portion 2d of the housing 2 (rear cabinet 2b). Light emitted from the light source unit 3 is reflected by the reflective sheet 7 and irradiated to the liquid crystal panel 1. Note that a light-guiding plate is not provided in the liquid crystal display device 100. Therefore, light emitted from the light source unit 3 passes through a layer of air in the liquid crystal display device 100 and is irradiated to the reflective sheet 7.

Specifically, the rear cabinet 2b has a slanted portion 2e (see FIG. 2) provided to protrude toward the front cabinet 2a side (Y1 direction side). The slanted portion 2e is provided to overlap with the light source unit 3 when vertically viewing the inner surface portion 2c to which the light source unit 3 is provided. Therefore, light emitted from the light-emitting surface 3c (see FIG. 3) of the light source unit 3 is reflected (see dotted arrow in FIG. 2) to the liquid crystal panel 1 side by the reflective sheet 7 provided on the slanted portion 2e.

Furthermore, the reflective plate 5 reflects at least a portion of light emitted from the light source unit 3, that has been reflected by the reflective sheet 7, to the liquid crystal panel 1 side. Specifically, light reflected by the reflective sheet 7 that has gone around to the back side (liquid crystal panel 1 side) of the diffusion plate 4 is reflected to the liquid crystal panel 1 side by the reflective plate 5.

Figure 6A:
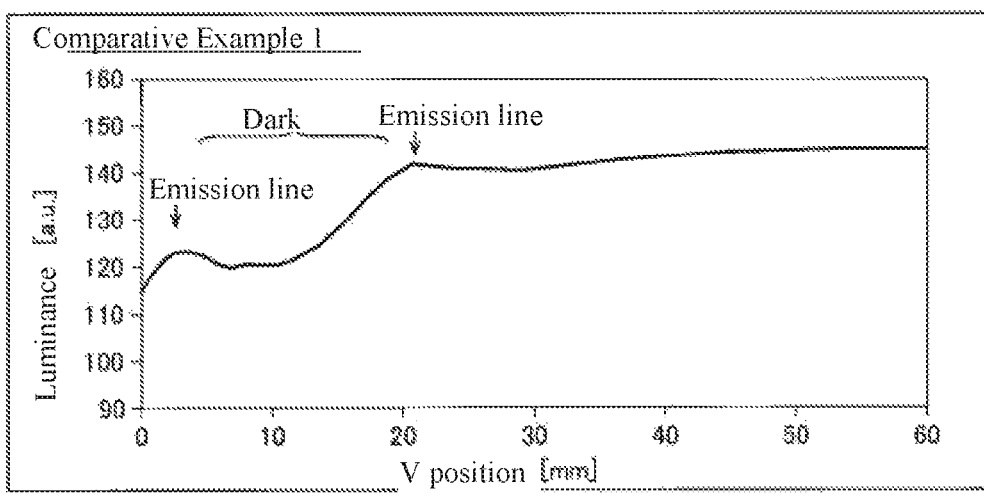
FIG. 6A is a diagram for describing the effects of the diffusion plate and reflective plate of the liquid crystal display device on the luminance of the liquid crystal panel, showing comparative example 1 wherein a diffusion plate and reflective plate are not provided.
Figure 6B:
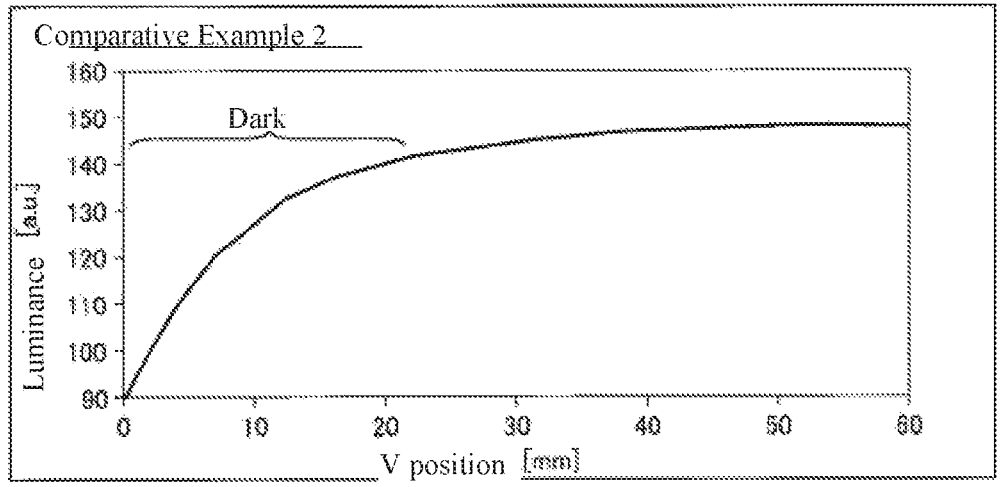
FIG. 6B is a diagram for describing the effects of the diffusion plate and reflective plate of the liquid crystal display device on the luminance of the liquid crystal panel, showing comparative example 2 wherein only a diffusion plate is provided.
Figure 6C:
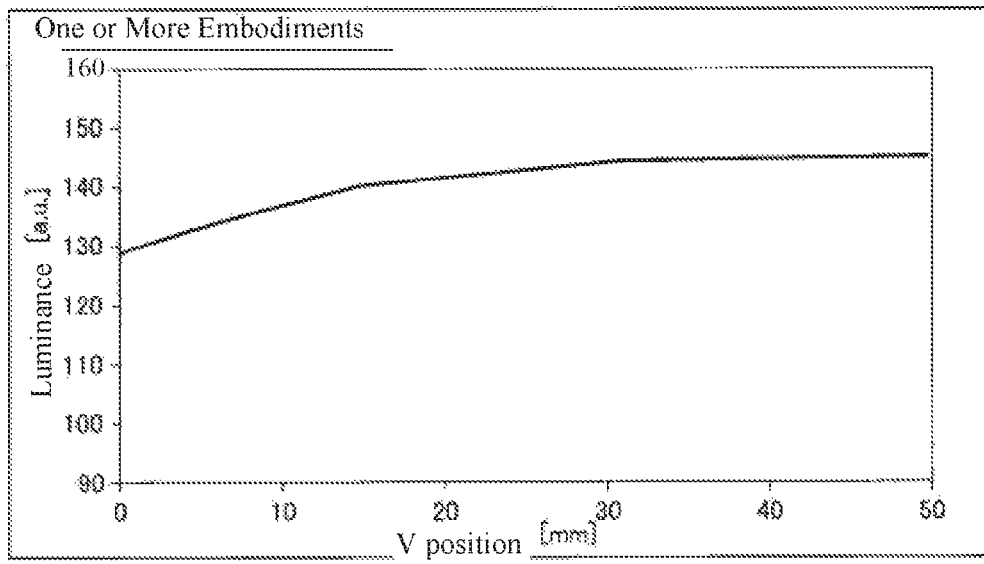
FIG. 6C is a diagram for describing the effects of the diffusion plate and reflective plate of the liquid crystal display device on the luminance of the liquid crystal panel, showing one or more embodiments wherein a diffusion plate and reflective plate are provided.

Next, the luminance of the liquid crystal panel 1 when the diffusion plate 4 and the reflective plate 5 are provided will be described referring to FIGS. 6A to 6C. Note that in FIGS. 6A to C, the vertical axis shows the luminance of the liquid crystal panel 1 and the horizontal axis shows the distance (hereafter referred to as the V position) from the inner surface portion 2c (see FIG. 4) of the housing 2.

First, a case will be described referring to FIG. 6A wherein both the diffusion plate 4 and the reflective plate 5 are not provided as comparative example 1. In such a case, a bright line (location where luminance is locally high) occurs on the liquid crystal panel 1 on locations where the V position is small (in FIG. 6A, positions where the V position is approximately 4 mm and approximately 20 mm). Furthermore, it becomes dark in the region where the V position is 0 mm to approximately 20 mm because the luminance of the liquid crystal panel 1 decreases overall.

Next, a case will be described referring to FIG. 6B wherein only the diffusion plate 4 is provided (the reflective plate 5 is not provided) as comparative example 2. In such a case, the bright lines that appeared in the results of FIG. 6A do not appear, but it becomes dark in the region where the V position is 0 mm to approximately 18 mm because the luminance of the liquid crystal panel 1 decreases overall.

Next, the configuration of one or more embodiments (configuration when both the diffusion plate 4 and the reflective plate 5 are provided) will be described referring to FIG. 6C. In such a case, bright lines do not appear, the luminance increases overall in regions where the V position is small (region where the V position is 0 mm to approximately 20 mm), and unevenness in luminance on the liquid crystal panel 1 is decreased compared to the cases in FIG. 6A and FIG. 6B. As a result, dark lines (locations where the luminance is locally low) do not occur on the liquid crystal panel 1.

(Experiment Results)

Next, experiment results will be described referring to FIG. 7A and FIG. 7B wherein the reflectivity of the reflective plate 5 is changed. Note that the diffusion plate 4 is not provided in this experiment.

Figure 7A:
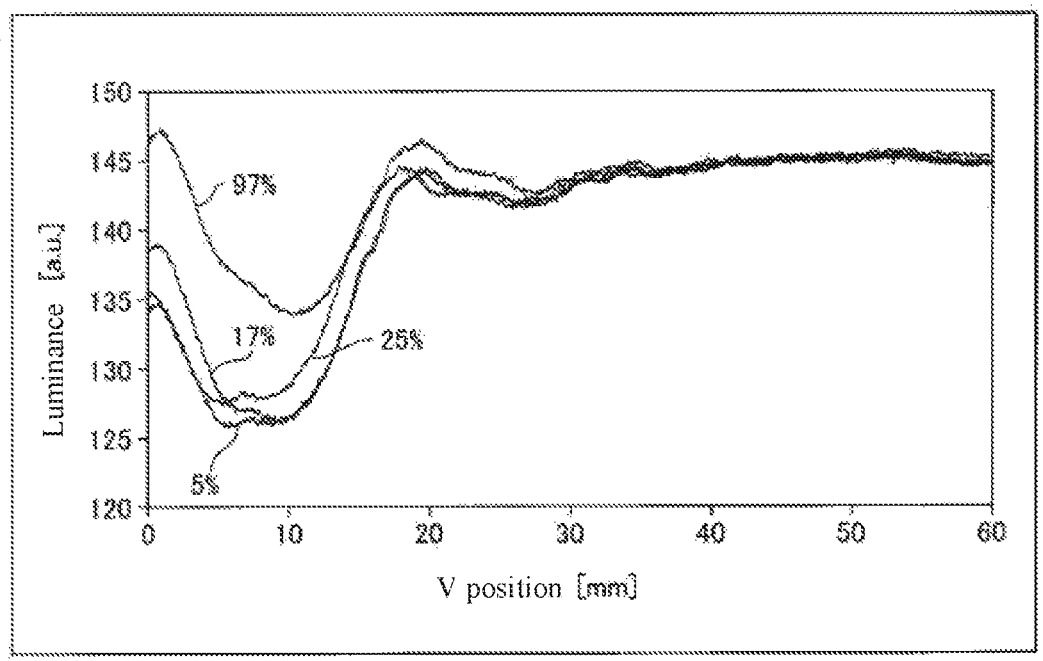
FIG. 7A is a diagram for describing the relationship of the reflectivity of the reflective plate and the luminance of the liquid crystal panel, illustrating the relationship between a V position and the luminance of the liquid crystal panel according to one or more embodiments.
Figure 7B:
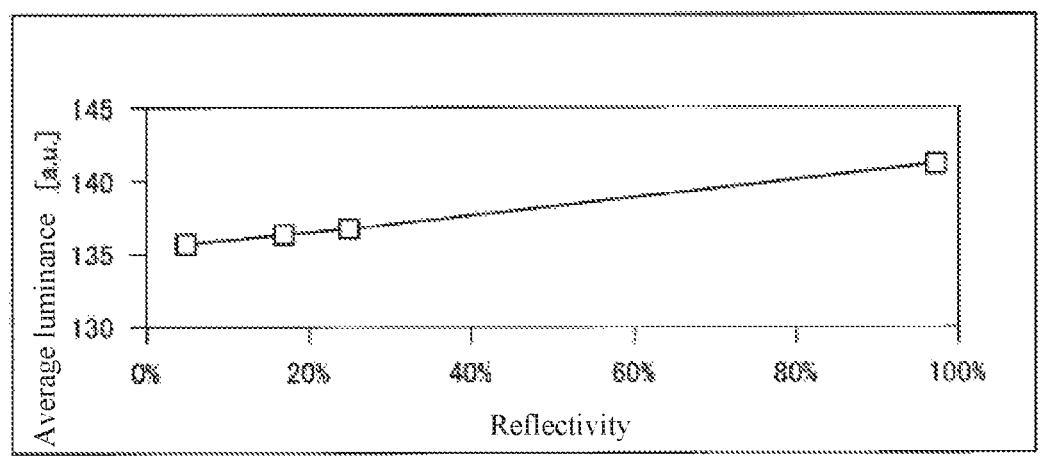
FIG. 7B is a diagram for describing the relationship of the reflectivity of the reflective plate and the luminance of the liquid crystal panel, illustrating the relationship between the reflectivity of the reflective plate and the average luminance of the liquid crystal panel according to one or more embodiments.

As illustrated in FIG. 7A and FIG. 7B, an experiment was performed in four patterns where reflectivity of the reflective plate 5 was 5%, 17%, 25%, and 97%. As illustrated in FIG. 7A, it was confirmed that when reflectivity is 97%, the luminance of the liquid crystal panel 1 is relatively high in the range of 0 mm to approximately 10 mm at the V position. Furthermore, as illustrated in FIG. 7B, a result was obtained wherein the higher the reflectivity of the reflective plate 5, the higher the average luminance of the liquid crystal panel 1.

Next, the experiment results when the width of the reflective plate 5 was changed will be described referring to FIG. 8A and FIG. 8B. Note that the width of the reflective plate 5 refers to the width (length) from the end 3g of the optical lens 3b at the liquid crystal panel 1 side to the end 5a (see FIG. 4) of the reflective plate 5 in the Y direction. Note that in this experiment, a measurement was taken wherein the reflectivity of the reflective plate 5 was 97%. Furthermore, this experiment was performed without providing the diffusion plate 4.

Figure 8A:
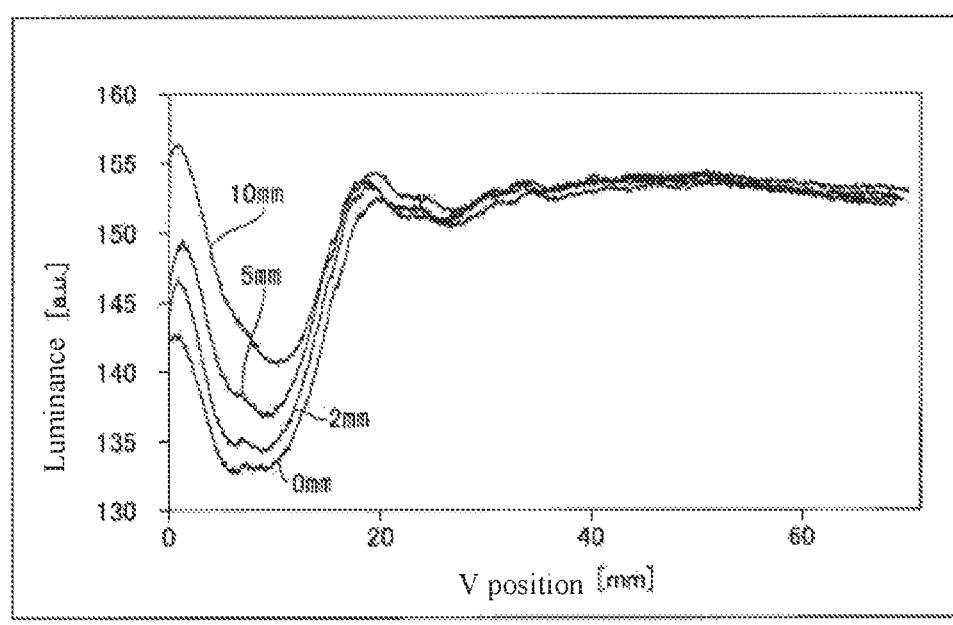
FIG. 8A is a diagram for describing the relationship between the width of the reflective plate and the luminance of the liquid crystal panel, illustrating the relationship between a V position and the luminance of the liquid crystal panel according to one or more embodiments.
Figure 8B:
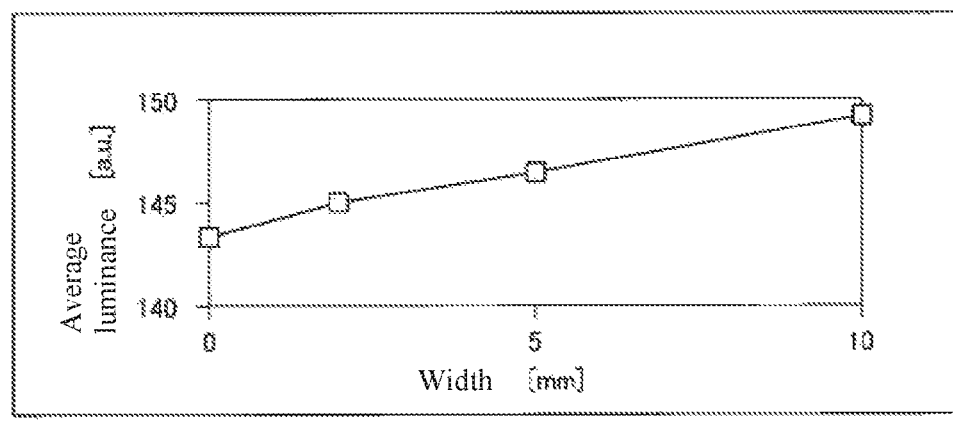
FIG. 8B is a diagram for describing the relationship between the width of the reflective plate and the luminance of the liquid crystal panel, illustrating the relationship between the width of the reflective plate and the average luminance of the liquid crystal panel according to one or more embodiments.

As illustrated in FIG. 8A and FIG. 8B, an experiment was performed in four patterns wherein the width of the reflective plate 5 was 0 mm, 2 mm, 5 mm, and 10 mm. As illustrated in FIG. 8A, it was confirmed that the larger the width of the reflective plate 5, the higher the luminance of the liquid crystal panel 1 in the range of 0 mm to approximately 10 mm at the V position. Furthermore, as illustrated in FIG. 8B, a result was obtained wherein the larger the width of the reflective plate 5, the higher the average luminance of the liquid crystal panel 1. Note that the width of the reflective plate 5 being 0 mm refers to not providing the reflective plate 5.

Next, the experiment results when the angle (angle θ3, see FIG. 4) of the reflective plate 5 was changed will be described referring to FIG. 9A and FIG. 9B. Note that this experiment was performed when transmittance, reflectivity, and diffusivity of light of the diffusion plate 4 were 75%, 25%, and 90% respectively, reflectivity of the reflective plate 5 was 97%, and the distance D2 (see FIG. 4) from the optical sheet 6 to the diffusion plate 4 was 9 mm.

Figure 9A:
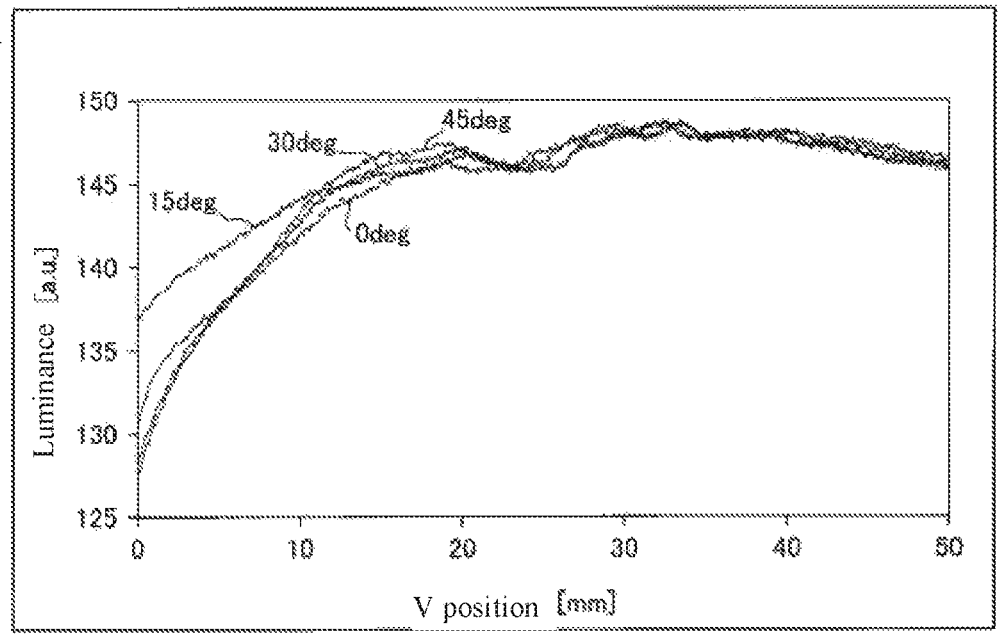
FIG. 9A is a diagram for describing the relationship between the angle of the reflective plate and the luminance of the liquid crystal panel, illustrating the relationship between a V position and the luminance of the liquid crystal panel according to one or more embodiments.
Figure 9B:
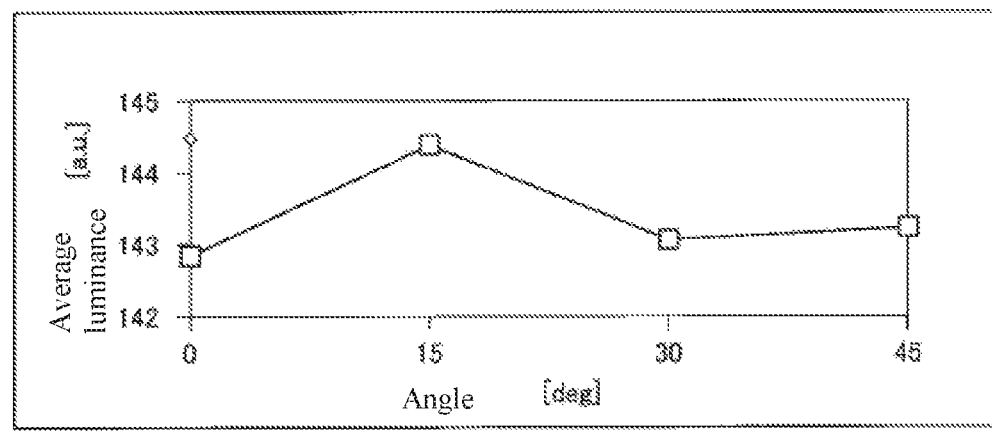
FIG. 9B is a diagram for describing the relationship between the angle of the reflective plate and the luminance of the liquid crystal panel, illustrating the relationship between the angle of the reflective plate and the average luminance of the liquid crystal panel according to one or more embodiments.

As illustrated in FIG. 9A and FIG. 9B, an experiment was performed in four patterns where the angle θ3 of the reflective plate 5 was 0°, 15°, 30°, and 45°. As illustrated in FIG. 9A, it was confirmed that when the angle θ3 of the reflective plate 5 is 15°, the luminance of the liquid crystal panel 1 is relatively high in the range of 0 mm to approximately 10 mm at the V position. Furthermore, as illustrated in FIG. 9B, a result was obtained wherein the average luminance of the liquid crystal panel 1 is highest when the angle θ3 of the reflective plate 5 is 15°.

Next, the experiment results when diffusivity of the diffusion plate 4 was changed will be described referring to FIG. 10A and FIG. 10B. Note that this experiment was performed without providing the reflective plate 5. Furthermore, this experiment was performed when transmittance, reflectivity, and diffusivity of light of the diffusion plate 4 was 75%, 25%, and 90% respectively.

Figure 10A:
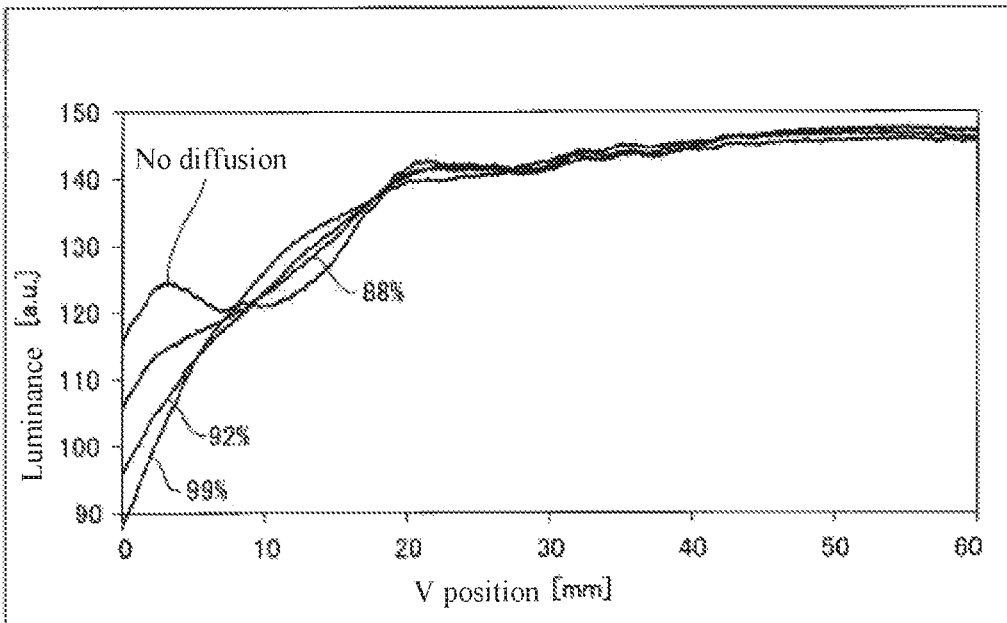
FIG. 10A is a diagram for describing the relationship between the diffusivity of the diffusion plate and the luminance of the liquid crystal panel, illustrating the relationship between a V position and the luminance of the liquid crystal panel according to one or more embodiments.
Figure 10B:
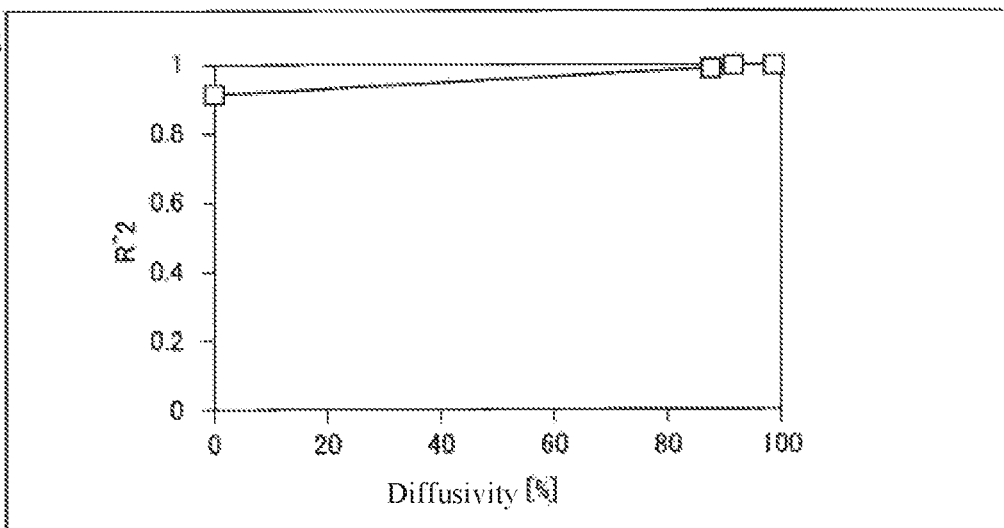
FIG. 10B is a diagram for describing the relationship between the diffusivity of the diffusion plate and the luminance of the liquid crystal panel, illustrating the relationship between the diffusivity of the diffusion plate and unevenness of luminance of the liquid crystal panel according to one or more embodiments.

As illustrated in FIG. 10A, an experiment was performed in four patterns where diffusivity of the diffusion plate 4 were 0% (no diffusion), 88%, 92%, and 99%. In light of the results of FIG. 10A, when quantifying the degree of unevenness in luminance as the square of the correlation coefficient (R), as illustrated in FIG. 10B, a result was obtained wherein the higher the luminance of the diffusion plate 4, the higher the value of the square of R (unevenness of luminance in the liquid crystal panel 1 is low).

Next, the experiment results when the distance D2 (see FIG. 4) from the optical sheet 6 of the diffusion plate 4 was changed will be described referring to FIG. 11A and FIG. 11B. Note that this experiment was performed without providing the reflective plate 5. Furthermore, this experiment was performed when transmittance, reflectivity, and diffusivity of light of the diffusion plate 4 were 75%, 25%, and 90% respectively.

Figure 11A:
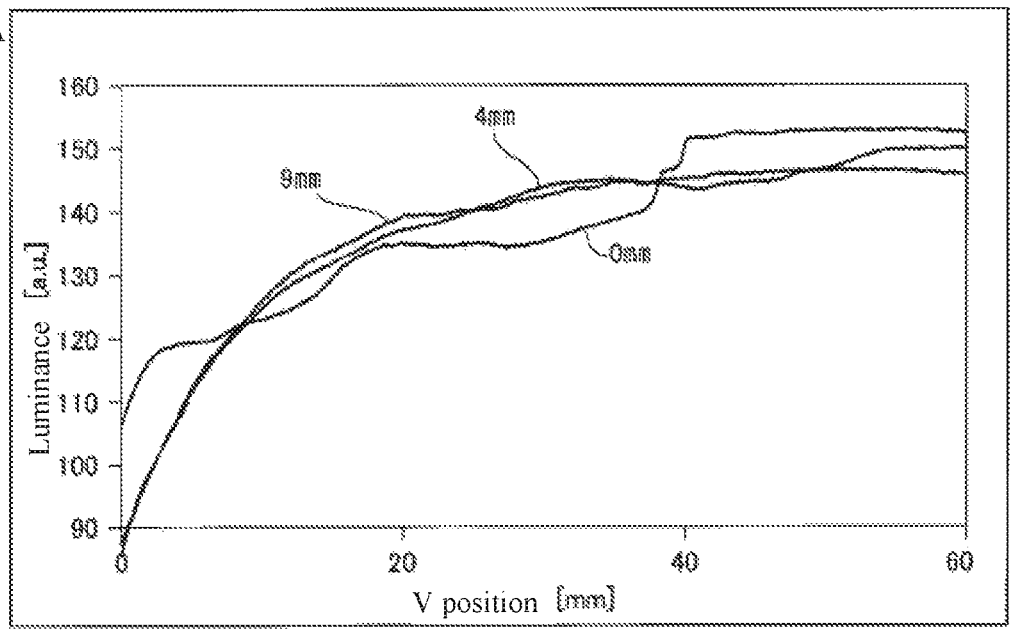
FIG. 11A is a diagram for describing the relationship between the position of the diffusion plate and the luminance of the liquid crystal panel, illustrating the relationship between a V position and the luminance of the liquid crystal panel according to one or more embodiments.
Figure 11B:
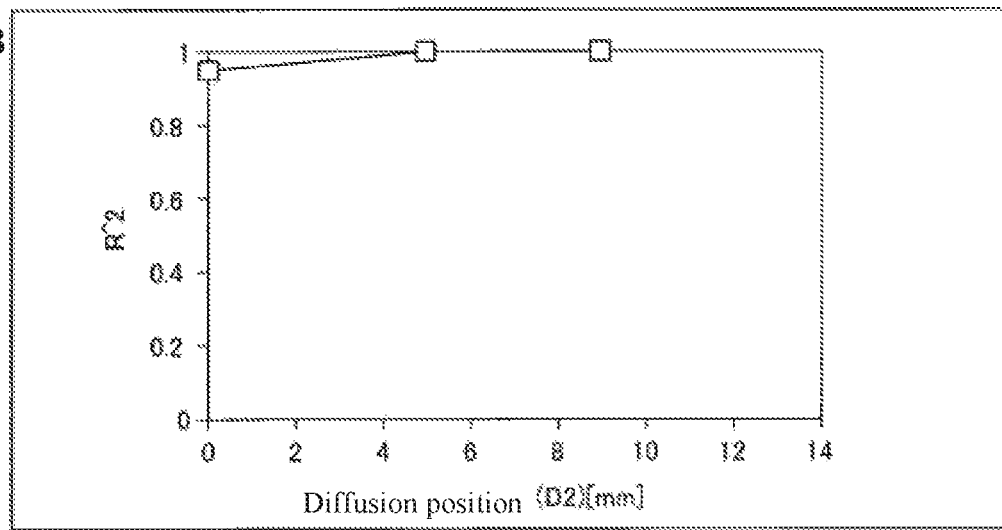
FIG. 11B is a diagram for describing the relationship between the position of the diffusion plate and the luminance of the liquid crystal panel, illustrating the relationship between the location of the diffusion plate and unevenness of luminance of the liquid crystal panel according to one or more embodiments.

As illustrated in FIG. 11A, an experiment was performed in three patterns where the distance D2 was 0 mm, 4 mm, and 9 mm. In light of the results of FIG. 11A, when quantifying the degree of unevenness in luminance as the square of the correlation coefficient (R), as illustrated in FIG. 11B, a result was obtained wherein the higher the distance D2, the higher the value of the square of R (unevenness of luminance in the liquid crystal panel 1 is low). Note that the distance D2 being 0 mm means that the diffusion plate 4 and the optical sheet 6 are closely adhered.

In light of the foregoing experiment results, it was confirmed that unevenness in luminance of the liquid crystal panel 1 reduces due to the diffusion function of the diffusion plate 4, and luminance of the liquid crystal panel 1 is higher due to the reflection function of the reflective plate 5. In light of the experiment results, it can be said that it is possible to suppress luminance increasing locally in the liquid crystal panel 1 while suppressing luminance from decreasing locally as shown in FIG. 6C by combining the diffusion function of the diffusion plate 4 and the reflection function of the reflective plate 5.

In one or more embodiments, the following effect can be obtained.

In one or more embodiments, as shown above, a liquid crystal display device 100 is configured, provided with a diffusion plate 4 provided between a light source unit 3 and the liquid crystal panel 1 for attenuating the intensity of light emitted from the light source unit 3 and passing it to the liquid crystal panel 1 side, and a reflective plate 5 for reflecting light passing through the diffusion plate 4 to the liquid crystal panel 1 side. Thus, it is possible to suppress luminance of the liquid crystal panel 1 from increasing locally by attenuating the intensity of light irradiated from the light source unit 3 with the diffusion plate 4. Moreover, even if the intensity of light irradiated from the light source 3 to the liquid crystal panel 1 side becomes too low due to the diffusion plate 4, it is possible to efficiently irradiate light to the liquid crystal panel 1 by reflecting light passing through the diffusion plate 4 to the liquid crystal panel 1 side with the reflective plate 5. Thus, it is possible to suppress luminance of the liquid crystal panel 1 from decreasing locally. Based on these results, it is possible to suppress luminance increasing locally in the liquid crystal panel 1 while suppressing luminance from decreasing locally.

Furthermore, in one or more embodiments, as shown above, the liquid crystal display device 100 is configured so as to be provided with an almost whole reflective plate 5 closer to the outer peripheral side than a display region A of the liquid crystal panel 1. Thus, it is possible to reflect light passing through the diffusion plate 4 and directed to the outer peripheral side of the display region A to the liquid crystal panel 1 side with the reflective plate 5. As a result, it is possible to efficiently irradiate light from the light source 3 to the liquid crystal panel 1, therefore it is possible to effectively suppress luminance of the liquid crystal panel 1 from decreasing locally.

Furthermore, in one or more embodiments, as shown above, the liquid crystal display device 100 is configured so that the reflective plate 5 has an almost flat plate shape, while tilted to the liquid crystal panel 1 side with respect to a perpendicular line α of the liquid crystal panel 1. Thus, light irradiated to the reflective plate 5 is easily reflected to the liquid crystal panel 1 side, therefore it is possible to efficiently reflect light from the reflective plate 5 to the liquid crystal panel 1 side.

Furthermore, in one or more embodiments, as shown above, the end 3g of the reflective plate 5 at the liquid crystal panel 1 side is located in the vicinity of the display region A of the liquid crystal panel 1. Thus, it is possible to suppress light leaking from between the end 3g of the reflective plate 5 on the liquid crystal panel 1 side and the display region A of the liquid crystal panel 1, therefore it is possible to more efficiently radiate (reflect) light passing through the diffusion plate 4 to the liquid crystal panel 1 side with the reflective plate 5.

Furthermore, in one or more embodiments, as shown above, the diffusion plate 4 is provided so as to block light emitted from a first concentrating unit 3h and a second concentrating unit 3i to the liquid crystal panel 1. Thus, it is possible to more effectively attenuate light irradiated from the first concentrating unit 3h and the second concentrating unit 3i with the diffusion plate 4, therefore it is possible to effectively suppress luminance of the liquid crystal panel 1 from increasing locally.

Furthermore, in one or more embodiments, as shown above, the liquid crystal display device 100 is configured so that the diffusion plate 4 is disposed closer to the optical lens 3b side than the center between the liquid crystal panel 1 and the end 3g of the optical lens 3b at the liquid crystal panel 1 side in the direction perpendicular to the liquid crystal panel 1. Thus, it is possible to shorten the distance between the optical lens 3b (first concentrating unit 3h) and the diffusion plate 4 in comparison to when the diffusion plate 4 is provided closer to the liquid crystal panel 1 side than the center between the liquid crystal panel 1 and the end 3g of the optical lens 3b at the liquid crystal panel 1 side. As a result, it is possible to easily block light from the optical lens 3b (first concentrating unit 3h) with the diffusion plate 4. Moreover, in this case the distance between the diffusion plate 4 and the liquid crystal panel 1 becomes relatively larger, therefore it is possible to diffuse light passing through the diffusion plate 4 more widely.

Furthermore, in one or more embodiments, as shown above, the liquid crystal display device 100 is configured so that the diffusion plate 4 is disposed in the vicinity of the optical lens 3b. Thus, it is possible to easily block light from the first concentrating unit 3h with the diffusion plate 4.

Furthermore, in one or more embodiments, as shown above, the liquid crystal display device 100 is configured so that the diffusion plate 4 and the reflective plate 5 are mutually formed with the same material. Thus, it is possible to reduce the types of parts in comparison to when the diffusion plate 4 and the reflective plate 5 are mutually formed with different materials.

Furthermore, in one or more embodiments, as shown above, the liquid crystal display device 100 is configured so that the diffusion plate 4 and the reflective plate 5 are integrally formed. Thus, it is possible to suppress the position of the diffusion plate 4 and the reflective plate 5 from becoming mutually dislodged. As a result, when reflecting light passing through the diffusion plate 4 with the reflective plate 5, it is possible to suppress variations in the reflection angle, etc. of light. Furthermore, it is possible to reduce the number of parts by integrally forming the diffusion plate 4 with the reflective plate 5.

Furthermore, in one or more embodiments, as shown above, the liquid crystal display device 100 is configured so that the reflective plate 5 reflects light emitted from the light source unit 3 and reflected by the reflective sheet 7 to the liquid crystal panel 1 side. Thus, it is possible to increase luminance of the liquid crystal panel 1 in comparison to when light reflected from the reflective sheet 7 cannot be reflected by the reflective plate 5. As a result, it is possible to suppress luminance of the liquid crystal panel 1 from decreasing locally.

Next, embodiments will be described with reference to FIG. 1 and FIG. 12. In one or more embodiments, unlike the configuration of the above embodiments in which the diffusion plate 4 is formed of a single material, a diffusion plate 14 is formed of a plurality of materials. Note that the same reference symbols are attached and illustrated in the drawings for the same configurations as the first embodiment, therefore an explanation thereof is omitted.

Figure 12:
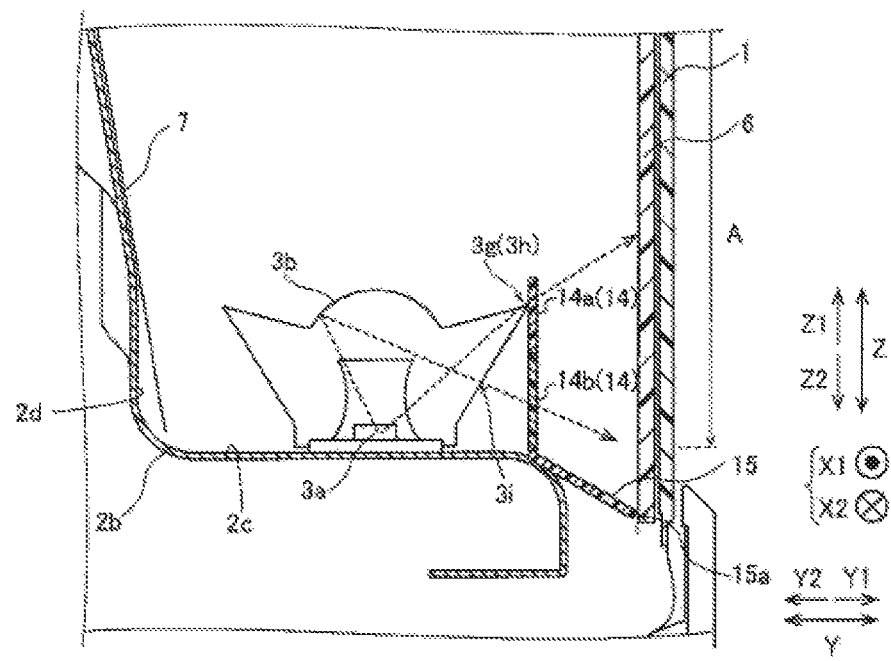
FIG. 12 is a partially expanded diagram of the light source unit periphery of the liquid crystal display device according to one or more embodiments.

As illustrated in FIG. 12, the liquid crystal display device 300 (see FIG. 1) is provided with a diffusion plate 14 and a reflective plate 15. The diffusion plate 14 and the reflective plate 15 are both formed individually and are connected at both ends. Furthermore, an end 15a of the reflective plate 15 on the liquid crystal panel 1 side is connected to the optical sheet 6. Note that the diffusion plate 14 and the reflective plate 15 are respective examples of the "attenuating plate" and the "reflection plate" in the scope of patent claims.

Here, in one or more embodiments, the diffusion plate 14 has different light transmittances for each part. Specifically, the diffusion plate 14 is formed by two-color molding (a formation method in which two types of resin are heat welded) of a diffusion part 14a and a transparent part 14b having a higher transmittance than the diffusion part 14a. The diffusion part 14a is provided on the upper side (Z1 direction) of the transparent part 14b. Note that transmittance and reflectivity of light of the diffusion part 14a are 3% and 97% respectively. Furthermore, the transparent part 14b is formed of, for example PET resin. Transmittance and reflectivity of light of the transparent part 14b are, for example, 90% and 10% respectively. Furthermore, the reflective plate 15 is formed of the same material as the diffusion part 14a, but it may be formed of different materials. Note that the diffusion part 14a and the transparent part 14b are examples of the "first part" and "second part" respectively in the scope of patent claims.

Furthermore, the reflective plate 15 may be formed of the same material as the reflective sheet 7. Note that the reflective plate 15 and the reflective sheet 7 are separated, and both are provided individually.

In this case, light from the first concentrating unit 3h of the optical lens 3b is irradiated to the diffusion part 14a. Also, part of the light irradiated to the diffusion part 14a is reflected to the back side (Y2 direction side) of the liquid crystal display device 300. Furthermore, part of the remaining light irradiated to the diffusion part 14a is diffused by the diffusion part 14a. At least a portion of light diffused by the diffusion part 14a is reflected by the reflective plate 15 to the liquid crystal panel 1 side.

Furthermore, light from the second concentrating unit 3i of the optical lens 3b permeates the transparent part 14b. At least a portion of the light that permeates the transparent part 14b is reflected by the reflective plate 15 to the liquid crystal panel 1 side.

Another configuration of one or more embodiment is the same as the above embodiments.

In one or more embodiments, the following effect can be obtained.

Here, in one or more embodiments, as shown above, the liquid crystal display device 300 is configured so that the diffusion plate 14 has different light transmittances for each part. Thus, it is possible to change the intensity of light emitted from the diffusion plate 14 for each part. As a result, it is possible to change the intensity of light irradiated to the liquid crystal panel 1 for each part, therefore it is possible to easily adjust luminance of each part in the liquid crystal panel 1.

Furthermore, in one or more embodiments, as shown above, the liquid crystal display device 300 is configured so that the diffusion plate 14 includes the diffusion part 14a with which light from the first concentrating unit 3h is irradiated and the irradiated light is diffused, and a transparent part 14b which has a higher light transmittance than the diffusion part 14a, and transmits the light from the second concentrating unit 3i and reflects it toward the liquid crystal panel 1 side with the reflective plate 15. Thus, light from the first concentrating unit 3h is shielded by the diffusion part 14a having a relatively low transmittance, thus the light is relatively largely attenuated, therefore it is possible to suppress luminance of the liquid crystal panel 1 from increasing locally due to light from the first concentrating unit 3h. Furthermore, it is possible to reduce the amount of attenuated light from the second concentrating unit 3i by light from the second concentrating unit 3i permeating the transparent part 14b with relatively high transmittance, therefore it is possible to suppress luminance of the liquid crystal panel 1 from reducing locally by using light from the second concentrating unit 3i.

Furthermore, in one or more embodiments, as shown above, the liquid crystal display device 300 is configured so that the reflective plate 15 is mutually formed with the same material as the reflective sheet 7. Thus, it is possible to reduce the types of parts in comparison to when the reflective sheet 7 and the reflective plate 15 are mutually formed with different materials.

Note that other effects of one or more embodiments are the same as the above embodiments.

Next, embodiments will be described with reference to FIG. 1, FIG. 13, and FIG. 14. In one or more embodiments, unlike the configuration of the above embodiments in which the transparent part 14b is provided, the transparent part 14b is not provided. Note that the same reference symbols are attached and illustrated in the drawings for the same configurations as the above embodiments, therefore an explanation thereof is omitted.

Figure 13:
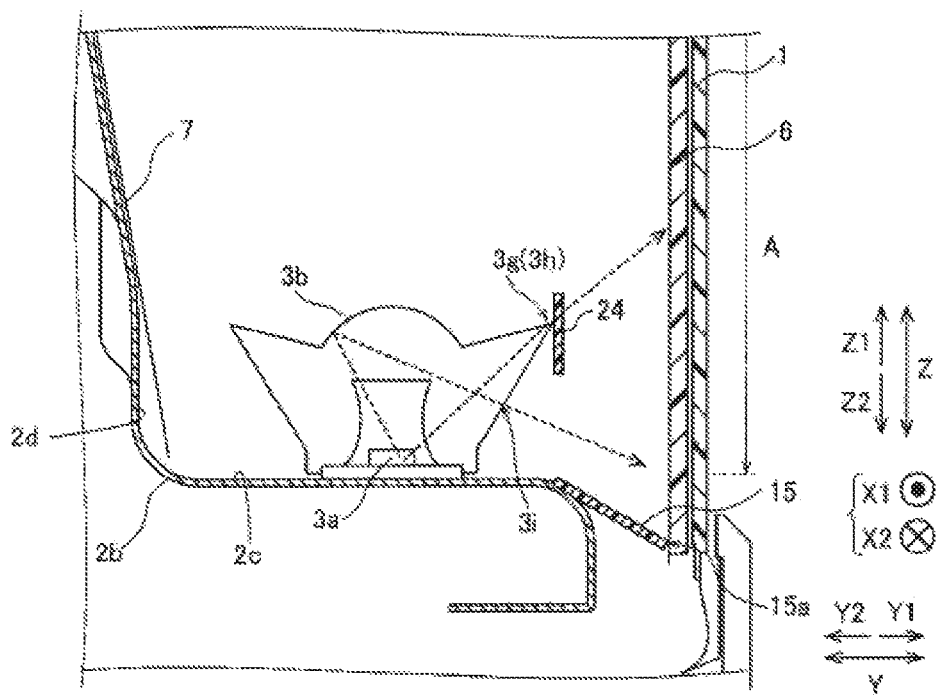
FIG. 13 is a partially expanded diagram of the light source unit periphery of the liquid crystal display device according to one or more embodiments.

As illustrated in FIG. 13, a liquid crystal display device 400 (see FIG. 1) is provided with a diffusion plate 24. The diffusion plate 24 and the reflective plate 15 are both formed individually. Specifically, the diffusion plate 24 and the reflective plate 15 are both provided mutually separate. Furthermore, the diffusion plate 24 is formed of the same material as the reflective plate 15, but it may be formed of different materials. Note that the diffusion plate 24 is an example of the "attenuating plate" in the scope of patent claims.

Here, in one or more embodiments, light from the first concentrating unit 3h of the optical lens 3b is irradiated to the diffusion plate 24. Also, part of the light irradiated to the diffusion plate 24 is reflected to the back side (Y2 direction side) of the liquid crystal display device 400. Furthermore, part of the remaining light irradiated to the diffusion plate 24 is diffused by the diffusion plate 24. At least a portion of light diffused by the diffusion plate 24 is reflected by the reflective plate 15 to the liquid crystal panel 1 side.

Furthermore, light from the second concentrating unit 3i of the optical lens 3b permeates between the diffusion plate 24 and the reflective plate 15. At least a portion of the light that permeates between the diffusion plate 24 and the reflective plate 15 is reflected by the reflective plate 15 to the liquid crystal panel 1 side.

Figure 14:
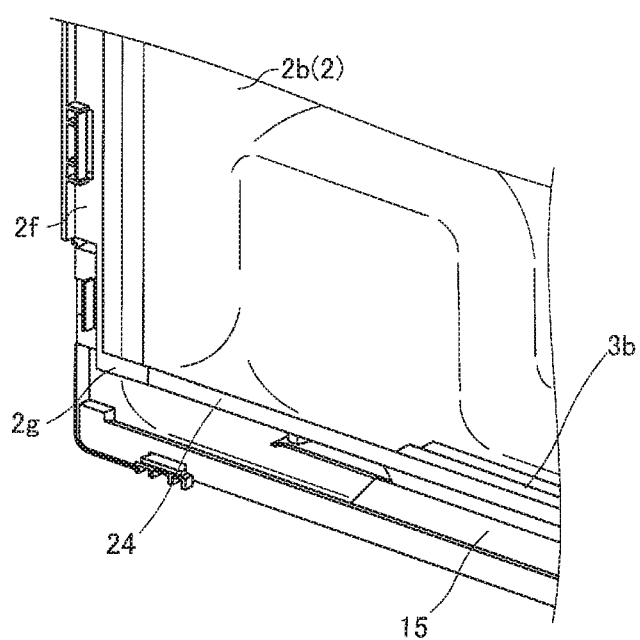
FIG. 14 is a diagram for describing the supporting structure of the diffusion plate in the liquid crystal display device according to one or more embodiments.

Furthermore, as shown in FIG. 14, the diffusion plate 24 is held by being attached to a guide 2f used when attaching a rear cabinet 2b to a front cabinet 2a. Specifically, the diffusion plate 24 is attached to a part 2g of the guide 2f extending to the diffusion plate 24 side. Note that FIG. 14 is a schematic drawing.

Another configuration of one or more embodiments is the same as the above embodiments.

In one or more embodiments, the following effect can be obtained.

In one or more embodiments, as shown above, the liquid crystal display device 400 is configured so that light from the first concentrating unit 3h is diffused by the diffusion plate 24, and light from the second concentrating unit 3i permeates between the diffusion plate 24 and the reflective plate 15 and is reflected by the reflective plate 15 to the liquid crystal panel 1 side. Thus, by blocking light from the first concentrating unit 3h with the diffusion plate 24, light from the first concentrating unit 3h is attenuated, therefore it is possible to suppress luminance of the liquid crystal panel 1 from increasing locally due to light from the first concentrating unit 3h. Furthermore, by light from the second concentrating unit 3i passing between the diffusion plate 24 and the reflective plate 15 as is, light from the second concentrating unit 3i is not attenuated, therefore it is possible to suppress luminance of the liquid crystal panel 1 from reducing locally by using light from the second concentrating unit 3i.

Furthermore, it is possible to reduce the number of parts by making light from the second concentrating unit 3i permeate (diffuse) with a separately provided member with high transmittance.

Note that other effects of one or more embodiments are the same as the above embodiments.

[Modifications]

Note that the embodiments presently disclosed should be considered as illustrative in all points and not restrictive. The scope of the present invention is indicated not by the description of the embodiments described above but by the scope of claims, and further includes all changes (modifications) within the meaning and scope equivalent to the scope of claims.

For example, in one or more embodiments, an example is given wherein the diffusion plate 4 (attenuating plate) and reflective plate 5 (reflection plate) are both formed of the same material, but the present invention is not limited to this. A reflection plate which is different in material from the diffusion plate 4 (attenuating plate) may be provided.

Figure 15:
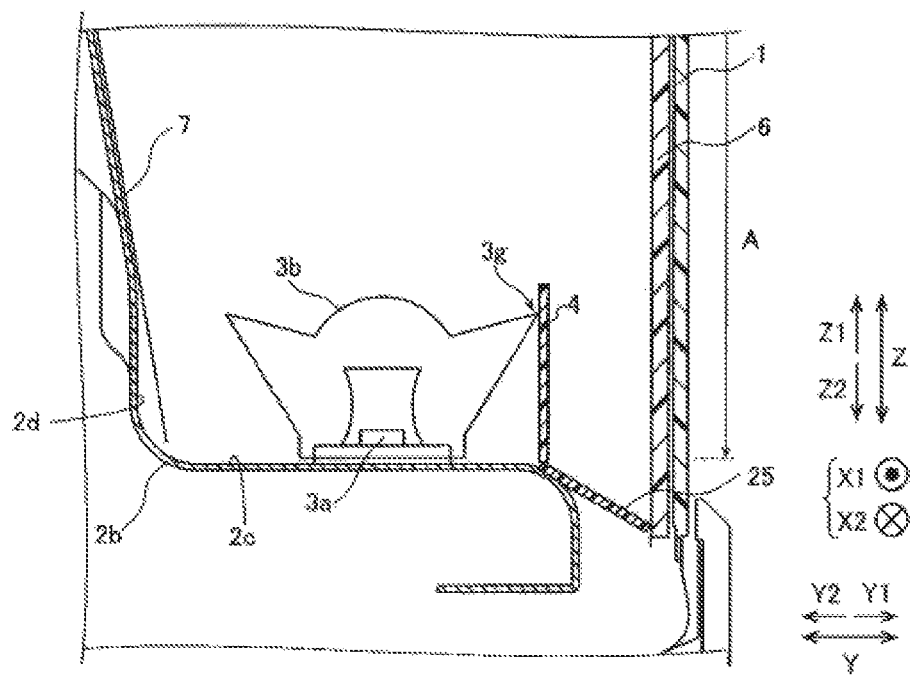
FIG. 15 is a partially expanded diagram of the light source unit periphery of the liquid crystal display device according to a first variation of one or more embodiments.

Specifically, as illustrated in FIG. 15, the diffusion plate 4 is formed of a material having a higher light diffusivity than that of the reflection plate 25. Furthermore, the reflective plate 25 is formed of a material having a higher light reflectivity than the diffusion plate 4. Specifically, reflectivity of light of the diffusion plate 4 and the reflective plate 25 are 25% and 97% respectively. Furthermore, the diffusivity of the diffusion plate 4 is 90%, and the diffusivity of the reflective plate 25 is a value lower than 90%. In this case, the diffusion plate 4 and the reflective plate 25 are connected at their ends. Note that the reflective plate 25 is an example of the "reflection plate" in the scope of patent claims.

Thus, it is possible to effectively attenuate the intensity of light with the diffusion plate 4 in comparison to when the diffusivity of the diffusion plate 4 is equal to or less than the diffusivity of the reflection plate 25. As a result, it is possible to suppress luminance of the liquid crystal panel 1 from increasing locally. Furthermore, light of higher intensity is reflected by the reflective plate 25 and is irradiated to the liquid crystal panel 1 in comparison to when reflectivity of the reflection plate 25 is equal to or less than the reflectivity of the diffusion plate 4. As a result, it is possible to more effectively suppress luminance of the liquid crystal panel 1 from decreasing drastically (luminance from reducing locally) when light intensity is excessively reduced by the diffusion plate 4 by irradiating the liquid crystal panel 1 with reflected light from the reflective plate 25.

Furthermore, in one or more embodiments an example is given wherein the reflective plate 5 (15) (reflection plate) is supported from below by the inner surface portion 2*c* of the housing 2, but the present invention is not limited to this. For example, the reflective plate (reflection plate) and the inner surface portion 2*c* may be separated.

Figure 16:
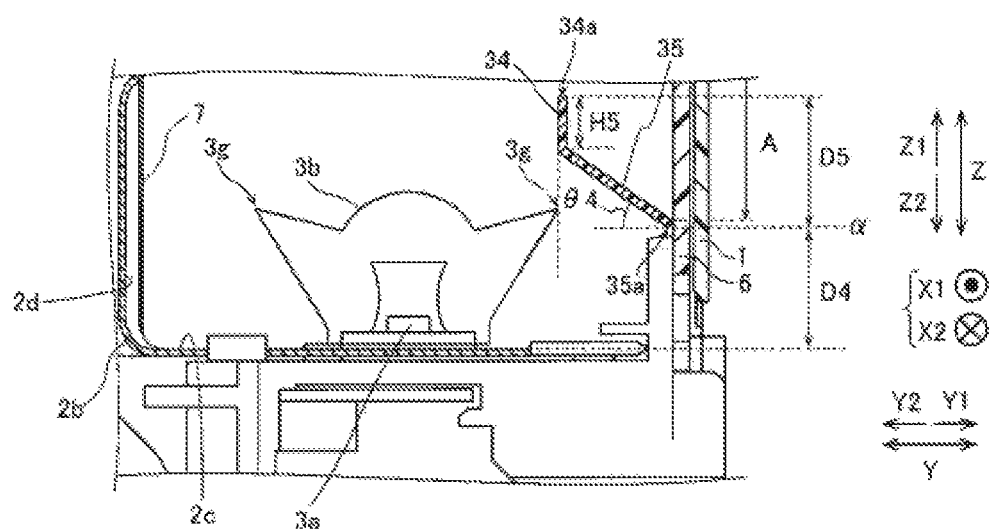
FIG. 16 is a partially expanded diagram of the light source unit periphery of the liquid crystal display device according to a second variation of one or more embodiments.

Specifically, as illustrated in FIG. 16, an end 35*a* of a reflective plate 35 at the liquid crystal panel 1 side are separated only by a distance D4 from the inner surface portion 2*c* in the vertical direction (Z direction). The distance D4, for example, is approximately 9 mm. The end 35*a* of the reflective plate 35 is positioned closer to the outer peripheral side (Z2 direction side) than the display region A. Note that the reflective plate 35 is an example of the "reflection plate" in the scope of patent claims.

Furthermore, the reflective plate 35 is tilted to the liquid crystal panel 1 side with respect to the perpendicular line α of the liquid crystal panel 1 only by an angle θ4. The angle θ4, for example, is approximately 35°.

Furthermore, the diffusion plate 34 has a height H5 in the vertical direction (Z direction) that is, for example, approximately 4 mm. Moreover, a distance D5 in the vertical direction (Z direction) from the end 35*a* of the reflective plate 35 to a top edge 34*a* of the diffusion plate 34 is, for example, approximately 10 mm. Note that the diffusion plate 34 and the reflection plate 35 are integrally formed with each other, and are formed of the same material. Transmittance and reflectivity of light of the diffusion plate 34 and the reflective plate 35 are 3% and 97% respectively. Furthermore, the diffusion plate 34 is an example of the "attenuating plate" in the scope of patent claims.

Furthermore, the position of the diffusion plate 34 in the Y direction is aligned with the position of the end 3*g* of the optical lens 3*b* at the liquid crystal panel 1 side in the Y direction.

Furthermore, in one or more embodiments an example is given wherein the end 3*g* of the optical lens 3*b* and the diffusion plate 4 (14, 24) (attenuating plate) are in contact, but the present invention is not limited to this. The end 3*g* of the optical lens 3*b* and the diffusion plate 4 (14, 24) (attenuating plate) may be separated.

Furthermore, in one or more embodiments an example is given wherein an end 5*a* (15*a*) of the reflective plate 5 (15) (reflection plate) is in contact with the optical sheet 6, but the present invention is not limited to this. The end 5*a* (15*a*) and optical sheet 6 may be separated.

Furthermore, in one or more embodiments, an example is given wherein the diffusion plate 14 (attenuating plate) has two parts of different materials (diffusion part 14*a* and transparent part 14*b*), but the present invention is not limited to this. The diffusion plate 14 (attenuating plate) may have three or more parts of different materials.

Furthermore, in one or more embodiments an example is given wherein the diffusion plate 24 (attenuating plate) and the reflective plate 15 (reflection plate) are mutually separated, and where light from the second concentrating unit 3*i* passes between the diffusion plate 24 (attenuating plate) and the reflective plate 15 (reflection plate), but the present invention is not limited to this. For example, it may be configured so that the diffusion plate 24 (attenuating plate) and the reflective plate 15 (reflection plate) are in mutual contact and so that light from the second concentrating unit 3*i* passes through a hole or slit provided in the diffusion plate 24 (attenuating plate).

Furthermore, in one or more embodiments an example is given wherein the reflective plate 15 (reflection plate) and reflective sheet 7 are both formed of the same material, but the present invention is not limited to this. The reflective plate 15 (reflection plate) and reflective sheet 7 may be formed of different materials.

Furthermore, in one or more embodiments, an example is given wherein the reflective plate 15 (reflection plate) and reflective sheet 7 are mutually separated, but the present invention is not limited to this. The reflective plate 15 (reflection plate) and reflective sheet 7 may be formed integrally.

Furthermore, in one or more embodiments an example is given wherein the liquid crystal display device 100 (300, 400) (display device) is not provided with a light guide plate, but the present invention is not limited to this. The liquid crystal display device 100 (300, 400) (display device) may be provided with a light guide plate.

Furthermore, in one or more embodiments an example is given wherein the light source unit 3 is provided on only one of the inner surface portions 2*c* provided along each of the four sides of the substantially rectangular liquid crystal panel 1, but the present invention is not limited to this. For example, the light source unit 3 may be provided on two or more inner surface portions 2*c*.

Furthermore, in one or more embodiments an example is given wherein the each of the diffusion plate 4 (14, 24) (attenuating plate) and reflective plate 5 (15) (reflection plate) have a substantially flat plate shape, but the present invention is not limited to this. For example, each of the diffusion plate 4 (14, 24) (attenuating plate) and reflective plate 5 (15) (reflection plate) may have a curved shape.

Furthermore, in one or more embodiments, an example is given wherein the diffusion plate 4 (attenuating plate) has a diffusion function, but the present invention is not limited to this. For example, the attenuating plate may be a member having only a transmission function for damping and transmitting the light intensity.

In the display device according to one aspect of the present invention, as described above, luminance of a display panel can be suppressed from increasing locally by a attenuating plate attenuating the intensity of light irradiated from a light source unit. Additionally, because light is attenuated by the attenuating plate, luminance on the display panel can be increased by a reflection plate reflecting light that has passed through the attenuating plate to the display panel side, even when the intensity of light irradiated to the display panel side from the light source unit decreases excessively. The luminance of the display panel can thereby be suppressed from decreasing locally. As a result, luminance can be suppressed from decreasing locally while suppressing luminance from increasing locally on the display panel.

According to one or more embodiments, the reflection plate can reflect light heading toward an outer peripheral side of a display region after passing through a attenuating plate to the display panel side. As a result, luminance on the display panel can effectively be suppressed from decreasing locally because light from the light source unit can be efficiently irradiated to the display panel.

According to one or more embodiments, light from the reflection plate can be efficiently reflected to the display panel side because it is easier for light irradiated to the reflection plate to be reflected to the display panel side.

According to one or more embodiments, light can be suppressed from leaking between an edge on the display panel side of the reflection plate and the display region of the display panel. Note that the vicinity of the display region includes both the location of the display region itself and around the display region.

According to one or more embodiments, luminance of the display panel can be suppressed from increasing locally due to light from a concentrating unit because the attenuating plate can attenuate light irradiated from the concentrating unit.

According to one or more embodiments, the distance between an optical lens (concentrating unit) and the attenuating plate can be decreased compared to when the attenuating plate is provided further toward the display panel side than a center between the edge of the display panel side of the optical lens and the display panel. As a result, the attenuating plate can easily shield light from the optical lens (concentrating unit). Moreover, in this case, because the distance between the attenuating plate and the display panel is relatively large, light that has passed through the attenuating plate can be diffused in a wider range toward the display panel side when the attenuating plate has a diffusing function.

According to one or more embodiments, the attenuating plate can more easily shield light from the concentrating unit. Note that the vicinity of the optical lens includes both the location of the optical lens itself and around the optical lens.

According to one or more embodiments, the types of components can be reduced compared to when the attenuating plate and reflection plate are formed using different materials.

According to one or more embodiments, the attenuating plate can more effectively diffuse light compared to when the diffusivity of the attenuating plate is equal to or less than the diffusivity of the reflection plate. As a result, the luminance of the display panel can be further suppressed from increasing locally. Furthermore, the reflection plate can radiate light to the display panel in a relatively efficient manner compared to when the reflectivity of the reflection plate is equal to or less than the reflectivity of the attenuating plate. As a result, the luminance of the display panel can be effectively suppressed from decreasing excessively (luminance locally decreasing) by radiating reflected light from the reflection plate to the display panel when the light intensity is excessively decreased by the attenuating plate.

According to one or more embodiments, the intensity of light emitted from the attenuating plate can be changed for each portion. As a result, the luminance for each portion of the display panel can easily be adjusted because the intensity of light irradiated to the display panel can be changed for each portion.

According to one or more embodiments, the luminance of the display panel can be suppressed from increasing locally due to light from a first concentrating unit because light is relatively greatly attenuated by a first portion having relatively low transmittance shielding light from the first concentrating unit. Furthermore, the luminance of the display panel can be suppressed from decreasing locally by utilizing light from a second concentrating unit because the attenuated amount of light from the second concentrating unit can be decreased due to light from the second concentrating unit passing through a second portion having relatively high transmittance.

According to one or more embodiments, the positions of the attenuating plate and reflection plate can be mutually displaced. As a result, the reflection angle of light due to the reflection plate can be suppressed from varying when light that has passed through the attenuating plate is reflected by the reflection plate. Furthermore, the number of components can be reduced by integrally forming the attenuating plate and the reflection plate.

According to one or more embodiments, the luminance of the display panel can be suppressed from locally increasing due to light from the first concentrating unit because light from the first concentrating unit is attenuated by light from the first concentrating unit being shielded by the attenuating plate. Furthermore, the luminance of the display panel can be suppressed from decreasing locally by utilizing light from the second concentrating unit because light from the second concentrating unit is not attenuated due to light from the second concentrating unit passing through the attenuating plate and reflection plate.

Furthermore, the number of components can be reduced compared to when light from the second concentrating unit is diffused using a separately provided member having high transmittance.

According to one or more embodiments, the luminance of the display panel can be increased compared to when light reflected from a reflective sheet is not reflected by the reflection plate. As a result, the luminance of the display panel can be suppressed from decreasing locally.

According to one or more embodiments, the types of components can be reduced compared to when the reflective sheet and reflection plate are formed using different materials.

According to one or more embodiments of the present invention, as described above, a display device can be provided that can suppress luminance from decreasing locally, while suppressing luminance from increasing locally on the display panel.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A display device comprising:
   a display panel;
   a housing that comprises a front face in which the display panel is disposed;
   a light source unit that is disposed on an inner surface of the housing, and comprises a light source and an optical lens covering the light source;
   an attenuating plate that is disposed between the light source unit and the display panel, and attenuates an intensity of light irradiated from the light source unit, the light passing through the attenuating plate toward the display panel; and
   a reflection plate that is disposed between the attenuating plate and the display panel and that reflects the light having passed through the attenuating plate toward the display panel, wherein
   the attenuating plate and the reflection plate are integrally formed.

2. The display device according to claim 1, wherein the reflection plate is disposed at least partially outside of a display region of the display panel.

3. The display device according to claim 2, wherein the reflection plate has a rectangular shape, and tilts toward the display panel with respect to a perpendicular line of the display panel.

4. The display device according to claim 1, wherein an end of the reflection plate on the side of the display panel is positioned in a vicinity of a display region of the display panel.

5. The display device according to claim 1, wherein
the optical lens comprises a concentration portion that emits light locally to the display panel, and
the attenuating plate interrupts light emitted from the concentration portion to the display panel.

6. The display device according to claim 5, wherein
the concentration portion is formed at an end of the optical lens on the side of the display panel, and
the attenuating plate is disposed further to the side of the optical lens than a center between the display panel and the end of the optical lens on the side of the display panel in a perpendicular direction with respect to the display panel.

7. The display device according to claim 6, wherein the attenuating plate is disposed in a vicinity of the optical lens.

8. The display device according to claim 1, wherein the attenuating plate and the reflection plate are composed of the same material.

9. The display device according to claim 1, wherein
the attenuating plate is composed of a material having a light diffusivity higher than a light diffusivity of the reflection plate, and
the reflection plate is composed of a material having a light reflectivity higher than a light reflectivity of the attenuating plate.

10. The display device according to claim 1, wherein the attenuating plate comprises a part having a light transmittance different from a light transmittance of another part of the attenuating plate.

11. The display device according to claim 10, wherein
the optical lens comprises a first concentration portion and a second concentration portion that emit light locally to the display panel, and
the attenuating plate comprises a first part that receives irradiated light from the first concentration portion and diffuses the irradiated light, and a second part that has a light transmittance higher than a light transmittance of the first part, wherein light from the second concentration portion passes through the second part and reflects on the reflection plate toward the display panel.

12. The display device according to claim 1, further comprising:
a reflective sheet that covers a bottom surface of the housing, the bottom surface being disposed to face the display panel, wherein
the reflection plate reflects, toward the display panel, the light emitted from the light source unit and reflected on the reflective sheet.

13. The display device according to claim 12, wherein the reflection plate is formed of the same material as the reflective sheet.

* * * * *